(12) United States Patent
Baysah et al.

(10) Patent No.: US 10,614,004 B2
(45) Date of Patent: *Apr. 7, 2020

(54) MEMORY TRANSACTION PRIORITIZATION

(71) Applicant: International Business Machines Corporation, Armonk, NY (US)

(72) Inventors: Irving G. Baysah, Pflugerville, TX (US); Prasanna Jayaraman, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/042,512

(22) Filed: Jul. 23, 2018

(65) Prior Publication Data
US 2018/0329628 A1 Nov. 15, 2018

Related U.S. Application Data

(63) Continuation of application No. 15/377,167, filed on Dec. 13, 2016, now Pat. No. 10,073,629.

(51) Int. Cl.
*G06F 12/00* (2006.01)
*G06F 13/18* (2006.01)

(52) U.S. Cl.
CPC .................................. *G06F 13/18* (2013.01)

(58) Field of Classification Search
CPC ........... G06F 12/00; G06F 12/12; G06F 13/00
USPC .................................. 711/100, 154, 156, 200
See application file for complete search history.

(56) References Cited

U.S. PATENT DOCUMENTS

| 6,425,060 | B1 * | 7/2002 | Mounes-Toussi ......................... G06F 12/0815 711/144 |
| 6,738,864 | B2 | 5/2004 | Chauvel |
| 7,032,046 | B2 | 4/2006 | Horii et al. |
| 7,444,637 | B2 | 10/2008 | Pronovost et al. |

(Continued)

OTHER PUBLICATIONS

List of IBM Patents Applications Treated As Related; dated Dec. 13, 2016, 2 pgs.

(Continued)

*Primary Examiner* — Tuan V Thai
(74) *Attorney, Agent, or Firm* — Cantor Colburn LLP; Bryan Bortnick

(57) ABSTRACT

Examples of techniques for memory transaction prioritization for a memory are disclosed. In one example implementation according to aspects of the present disclosure, a computer-implemented method includes allocating, by a memory controller, a reserved portion of the memory controller to execute transactions. The method further includes receiving, by the memory controller, a priority based transaction from a processor to the memory. The method further includes determining, by the memory controller, whether to accommodate the priority based transaction based at least in part on a current processing state of the memory controller. The method further includes, based at least in part on determining to accommodate the priority based transaction, accommodating the priority based transaction by performing at least one of dropping a speculative command in a queue or using the reserved portion of the memory controller to execute the priority based transaction.

20 Claims, 4 Drawing Sheets

(56) References Cited

U.S. PATENT DOCUMENTS

| | | |
|---|---|---|
| 7,650,453 B2 | 1/2010 | Torii |
| 7,945,747 B2 | 5/2011 | Kataoka et al. |
| 8,180,963 B2 | 5/2012 | Conte et al. |
| 8,209,439 B2 | 6/2012 | Marcu et al. |
| 8,392,586 B2 | 3/2013 | Collins et al. |
| 8,667,493 B2 | 3/2014 | Chung et al. |
| 8,683,128 B2 | 3/2014 | Daly et al. |
| 8,949,845 B2 | 3/2015 | Steffens et al. |
| 9,065,740 B2 | 6/2015 | Mopur et al. |
| 9,135,165 B2 | 9/2015 | Terada |
| 9,201,816 B2 | 12/2015 | Mace |
| 9,335,934 B2 | 5/2016 | Luan et al. |
| 9,355,035 B2 | 5/2016 | Goodman et al. |
| 9,361,257 B2 | 6/2016 | Ziakas et al. |
| 2012/0311269 A1 | 12/2012 | Loh et al. |
| 2014/0189180 A1 | 7/2014 | Kumar et al. |
| 2016/0092379 A1 | 3/2016 | Svendsen et al. |
| 2016/0210058 A1 | 7/2016 | Kirshenbaum et al. |
| 2018/0165008 A1 | 6/2018 | Baysah et al. |

OTHER PUBLICATIONS

Anonymously,"Efficient method for implementing a threshold counter used to reject lower priority reads in a Memory Controller", IP, Jan. 24, 2013, p. 1-7.

Younghui Li, et al."Modeling and Verification of Dynamic Command Scheduling for Real-Time Memory Controllers" IEEE, 2016, p. 1-12.

\* cited by examiner

MEMORY TRANSACTION PRIORITIZATION

CROSS-REFERENCE TO RELATED APPLICATIONS

This application is a continuation of U.S. patent application Ser. No. 15/377,167, entitled "MEMORY TRANSACTION PRIORITIZATION," filed Dec. 13, 2016, the disclosure of which is incorporated by reference herein in its entirety.

BACKGROUND

The present disclosure generally relates to a data processing system and, more particularly, relates to memory transaction prioritization in a data processing system.

In a computer processing system, memory requirements may be driven by the performance of a workload on the system. A host bus protocol of the system's processor ensures performance, for example, by maintaining latency and throughput across different reads and writes to the memory. An efficient and well-designed cache structure provides faster turnaround time in fetching data that is being shared across cores of a processor to make up for inherent gaps in fetching streams from the memory.

A memory buffer also plays a role in increasing throughput and optimizing the memory usage patterns with dual in-line memory modules. However, during heavy utilization and targeted memory usage, a memory controller of the processing system can stall. When this happens, the memory controller may retry some transactions due to the memory being busy and/or may retry some of the reads/writes while some of the internal logic and queues are full.

SUMMARY

According to examples of the present disclosure, techniques including methods, systems, and/or computer program products for memory transaction prioritization for a memory are provided. An example method includes allocating, by a memory controller, a reserved portion of the memory controller to execute transactions. The method further includes receiving, by the memory controller, a priority based transaction from a processor to the memory. The method further includes determining, by the memory controller, whether to accommodate the priority based transaction based at least in part on a current processing state of the memory controller. The method further includes, based at least in part on determining to accommodate the priority based transaction, accommodating the priority based transaction by performing at least one of dropping a speculative command in a queue or using the reserved portion of the memory controller to execute the priority based transaction.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

Figure 1:
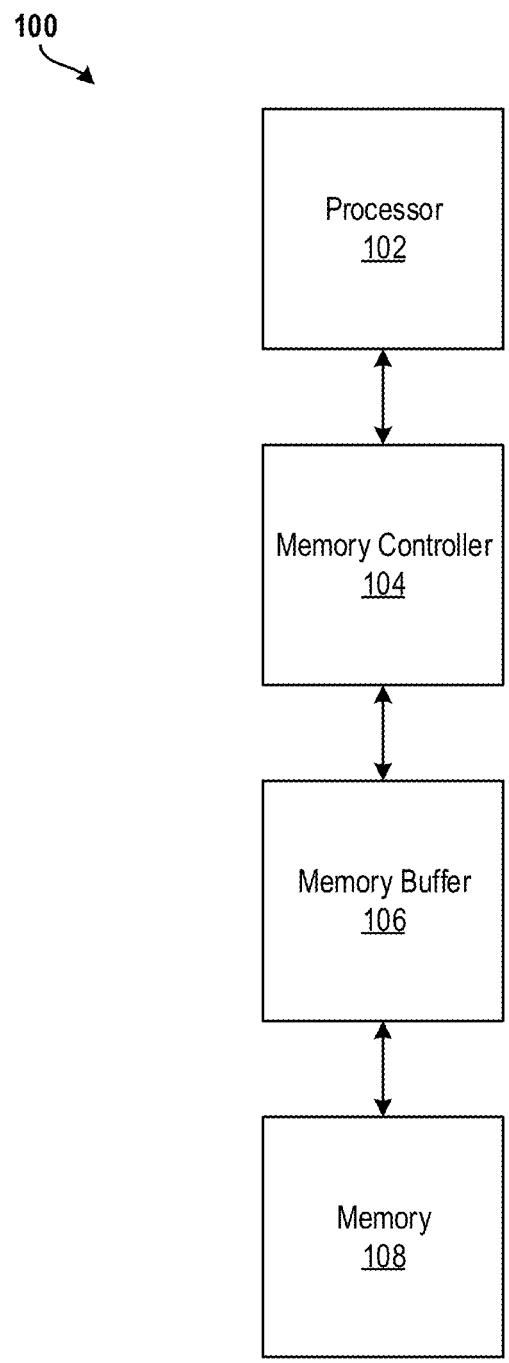
FIG. 1 illustrates a block diagram of a processing system for memory transaction prioritization according to examples of the present disclosure.

In processing systems, the memory requirement is driven by the performance of the workload and the host bus protocols take necessary care to ensure performance. Ensuring performance involves maintaining latency and throughput across different reads and writes to the main memory.

One reason for memory control retries on the host bus is due to limited resources (or coherency machines). Accordingly, it is important that a memory controller manages its state machines in an efficient manner to handle various types of operations from numerous threads in a large symmetric multi-processor (SMP) system. As a result, several existing techniques to balance the usage of an internal architecture of the memory controller to arrive at improved throughput rate and latency have been employed, but none of them address the priority level of the data transactions.

For example, in one existing technique, a memory controller may simply prioritize based on a transfer type (ttype) of a request. For instance, if a read ttype and a prefetch operation are fighting for the same resource, the read is given a higher priority. However, if there are two reads contending for the same resource, there is no indication from the processor as to the importance or priority of either of the two read requests. In such cases, a first come first serve strategy may be employed. In these existing memory resource management schemes, the type of workload is not given any consideration and the host bus could see multiple retries while some processor cores might be stalling or waiting for important data to be returned.

Various implementations are described below by referring to several examples of memory transaction prioritization in a data processing system. In particular, the present techniques provide for the memory subsystem to prioritize a particular read or write transaction when compared to other transactions immaterial of the state of the memory subsystem. This can be achieved by enabling a software methodology to supply the priority by the user (or compiler) and hence get an upper hand in ordering the data transaction. Next, a local RC machine is created and other logic is reserved to accommodate these kind of scenarios. The host bus changes to respond with a retry request challenging/acknowledging the core to continue with forced data transfer. Finally, the memory controller provides for looking and ordering the available transactions inside the memory controller and makes a decision as to whether forced data transfer can be prioritized.

Example embodiments of the disclosure include or yield various technical features, technical effects, and/or improvements to technology. Example embodiments of the disclosure provide memory transaction prioritization techniques for a memory to enable a memory controller to execute prioritized requests using a reserved resource portion of the memory controller to prevent higher priority tasks from being dropped when the memory controller becomes full. These aspects of the disclosure constitute technical features that yield the technical effect of improved memory management by dropping lower priority tasks while enabling a reserved portion of the memory controller to execute higher priority tasks. As a result of these technical features and technical effects, a processing system in accordance with example embodiments of the disclosure represents an improvement to existing memory management techniques. It should be appreciated that the above examples of technical features, technical effects, and improvements to technology of example embodiments of the disclosure are merely illustrative and not exhaustive.

FIG. 1 illustrates a block diagram of a processing system 100 for memory transaction prioritization according to examples of the present disclosure. The various components, modules, engines, etc. described regarding FIG. 1 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory (e.g., a memory 108), and the hardware may include a processor 102 for executing those instructions. Thus the memory 108 can store program instructions that when executed by processor 102 implement the engines described herein. Other engines may also be utilized to include other features and functionality described in other examples herein.

Processing system 100 may include the processor 102, a memory controller 104, a memory buffer 106, and the memory 108. Alternatively or additionally, the processing system 100 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

The processor 102 issues a command with an associated priority to the memory 108 through the memory controller 104 and the memory buffer 106. The memory 108 analyzes the command with the associated priority to determine if the memory 108 can accommodate the priority using its internal resources. If the memory controller 104 can accommodate the request with a certain priority, the memory controller 104 retries a partial response as a "retry if you can" command, which indicates to the processor 102 that the memory controller 104 can still accommodate the request.

The memory controller 104 then internally prepares to accommodate the request. A force feed of data starts from the memory controller 104 if the request is a read request. A force feed of data starts a cache on the processor 102 if the request is a write request.

If the memory 108 cannot accommodate the request with a priority, the memory 108 responds with a retry conclusion as is done during normal protocols.

To implement the present techniques, a host bus control may be modified as follows. In a command/response based host bus protocol, the partial response is modified to give the coherency state of the line. A special case of transaction in the host bus protocol may be added to give the memory controller 104 the ability to force the processor 102 to force a read/write that addresses even though it retries. This means that the memory controller 104 has reserved logic that can fetch/write the data.

The memory controller 104 may be enabled to reserve a portion for the prioritization techniques described herein and deploy the reserved portion when a high priority transaction occurs. For example, the memory controller 104 may allocate 80% of its resources to performing workloads and reserve 20% for performing high priority tasks. During normal operations, the memory controller 104 uses the 80% reserved for performing workloads to perform all workloads (even those with a high priority). If the 80% becomes full, the remaining 20% may be used to process high priority tasks while declining to process lower priority tasks.

In this way, the memory controller 104 creates a dynamic resource usage between priority and non-priority (i.e., regular/normal) workloads. In some examples, the reserved portion may be dynamically modified in order for the system 100 to make changes to the way priority is being used. For example, if the system 100 tends to process many high priority tasks, it may reserve a larger portion (i.e., 35%) for performing the higher priority workloads.

The priority is used based on a decision making process as follows. In some examples, the decision making process may be as follows. At any time, a priority transaction reaches the memory controller 104. The memory controller 104 looks for a reserved resource logic to accommodate the request. The memory controller 104 then analyzes existing transactions on the queue to identify speculative (i.e., low priority) transactions that can be dropped. Examples of speculative transactions that can be dropped include prefetch, data cache block set to zero, etc. If possible, the memory controller 104 includes a priority request accommodation using its reserved resource or by existing resource rearrangement. The system 100 can track and use the priority as much as possible based on feedback from the memory controller 104.

In another example, the memory controller 104 receives a priority based transaction and makes a decision whether to accommodate the request. This may be done by either dropping a speculative command in the queue or by making use of the additional reserved resource. The decision to choose one or the other depends on, for example, the current processing state of the memory controller 104 at that point. This means that a decision can always be forced at the memory controller 104 level, given a register setting which priorities to be favored. The first of its kind priority transaction can be handled differently as against subsequent transactions. Moreover, the current state of priority transaction handling can be communicated back to the processor 102 or written to a register of the memory controller 104. This enables software executing on the processor 102 to decide on a next step. In another example, the memory controller 104 may include logic to invalidate or drop certain transactions. In some examples, there can also be a constant communication on the preferred usage setting back to the memory controller 104 and also a possibility to poll before the software can decide for priority transaction.

Dropping a speculative command in the queue may be followed up by propagating the dropped commands back to the initiator (i.e., the processor 102) of the commands depending on the host bus protocol. The initiator, based on a confidence index, comes back to the memory controller 104 if there is a need to have the dropped commands performed. In other words, the dropped commands are not speculative but are a requirement. In some cases, the initiator may agree with the memory controller 104 on dropping the commands. In such cases, the initiator restarts a new transfer with a different type.

In parallel with the memory controller 104, the dropped commands can be marked invalid until the initiator returns with a different type of request or commands the memory controller 104 to perform dropped commands that are deemed required and not speculative. This loop completes the protocol flow and is one possible implementation. Different processors can deal with dropped commands in different ways.

Making use of the additional reserved resource may be decided based on the follow. In one example, the memory controller 104 includes a setting that masks everything else to use the additional resource usage. In another example, the memory controller 104 includes logic that determines additional resource usage by taking into account various parameters of that logic. In yet another example, the processor 102 may override the additional resource usage. In each of these cases, additional resource usage occurs and there can exist logic in the memory controller 104 or the processor 102 to bring down the additional usage by determining dropping possibilities. For example, the processor 102 can query the memory controller 104 for speculative data presence, and then the memory controller 104 negotiates with the processor 102 to drop the speculative data. This effectively gains the additional resource space in the memory controller 104.

Figure 2:
FIG. 2 illustrates a table of conditions determining priority of a request according to examples of the present disclosure.

FIG. 2 illustrates a table 200 of conditions determining the priority of a request according to examples of the present disclosure. Workloads may be assigned a priority, such as utilizing existing software and/or hardware techniques. Two types of usage for the priority may exist. First, the usage of the priority may be tracked and used when required based on reasoning. Second, start with a priority without analyzing the need. In either case, a priority of transactions that occurred previously are tracked.

The table 200 of conditions determining the priority of a request includes types of operations 202 and corresponding conditions 204 and weightages 206. For example, a read operation 202 may be associated with a core pipeline stall condition 204 that has a high weightage 206. In another example, a read operation 202 may be associated with a core pipeline not stalled condition 204 that has a high medium weightage 206. In yet another example, a read operation 202 may be associated with a branch prediction condition 204 that has a medium weightage 206. In another example, a data cache block set to zero (DCBZ) condition 202 is associated with an initialize memory condition 204 that has a medium low condition 206. In yet another example, a prefetch operation 202 is associated with a hit in page condition 204 that has a medium low weightage 206. In another example, a prefetch operation 202 is associated with a speculative condition 204 that has a low weightage 206.

According to examples of the present disclosure, the weightages may be associated with numbers, percentages, colors, or other indicia of degree. For example, a high weightage may be assigned the number 5, a high medium weightage the number 4, a medium weightage the number 3, a medium low weightage the number 2, and a low weightage the number 1.

As illustrated in table 200, the priority and priority weightage can be propagated to the memory controller (e.g., the memory controller 104 of FIG. 1) so that the memory controller can decide what decision to make. For example, the memory controller can decide to use a dedicated resource, to kill an existing prefetch operation, etc.

Figure 3:
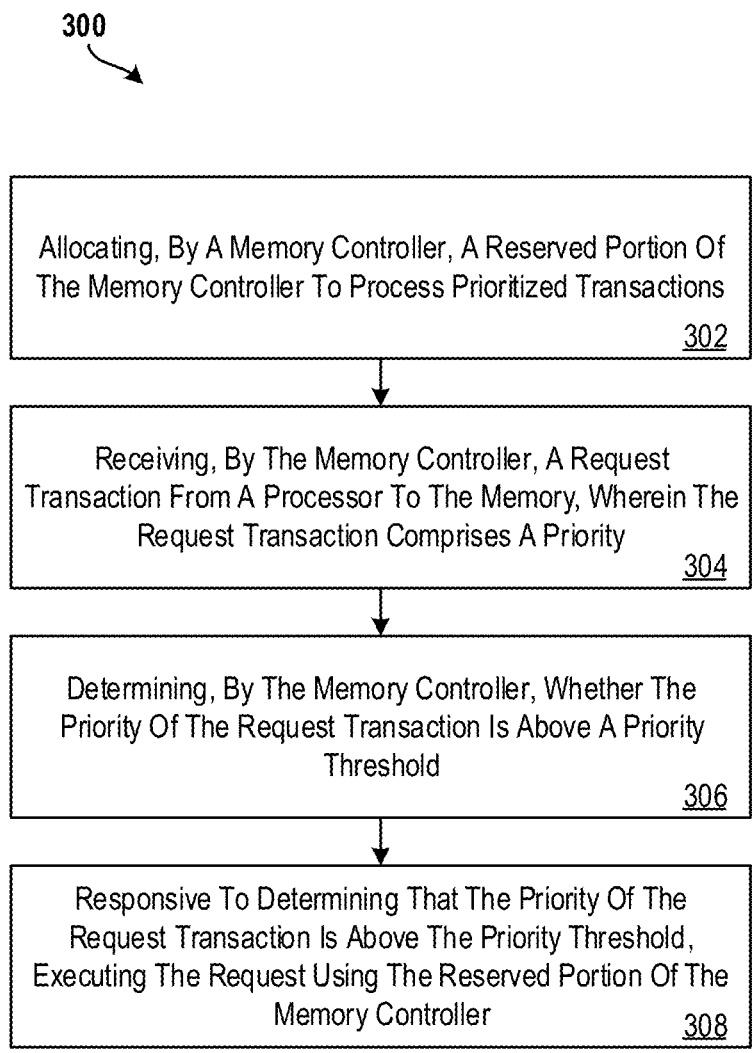
FIG. 3 illustrates a flow diagram of a method for memory transaction prioritization according to examples of the present disclosure.

FIG. 3 illustrates a flow diagram of a method 300 for memory transaction prioritization according to examples of the present disclosure. The method 300 may be performed, for example, by the processing system 100 of FIG. 1, by the processing system 20 of FIG. 4, or by another suitable processing system.

At block 302, the method 300 includes allocating, by a memory controller (e.g., the memory controller 104 of FIG. 1), a reserved portion of the memory controller to process prioritized transactions.

At block 304, the method 300 includes receiving, by the memory controller, a request transaction from a processor (e.g., the processor 102 of FIG. 1) to the memory (e.g., the memory 108 of FIG. 1). The request transaction includes a priority (e.g., low, low-medium, medium, medium-high, high, etc.). The request transaction may be a read operation, a data cache block set to zero operation, a prefetch operation, and the like.

At block 306, the method 300 includes determining, by the memory controller, whether the priority of the request transaction is above a priority threshold. The priority threshold may be adjustable automatically based on system conditions, adjustable manually by a user, or the like. The reserved portion of the memory controller is adjustable as a percentage of an overall capacity of the memory controller. For example, the reserved portion may be 20% of the total resources of the memory controller, while the remaining 80% is a non-reserved portion.

At block 308, the method 300 includes, responsive to determining that the priority of the request transaction is above the priority threshold, executing the request using the reserved portion of the memory controller.

In additional examples, the method 300 may include, responsive to determining that the priority of the request transaction is not above a priority threshold, determining, by the memory controller, whether resources exist a non-reserved portion of the memory controller to accommodate the request transaction. Further, the method 300 may include, responsive to determining that resources exist in the non-reserved portion of the memory controller to accommodate the request transaction, executing the request using the non-reserved portion of the memory controller.

In yet additional examples, the method 300 includes identifying at least one of a plurality of transaction requests pending in a queue of the memory controller as being a speculative transaction request and dropping the at least one speculative transaction request.

Additional processes also may be included, and it should be understood that the processes depicted in FIG. 3 represent illustrations, and that other processes may be added or existing processes may be removed, modified, or rearranged without departing from the scope and spirit of the present disclosure.

Figure 4:
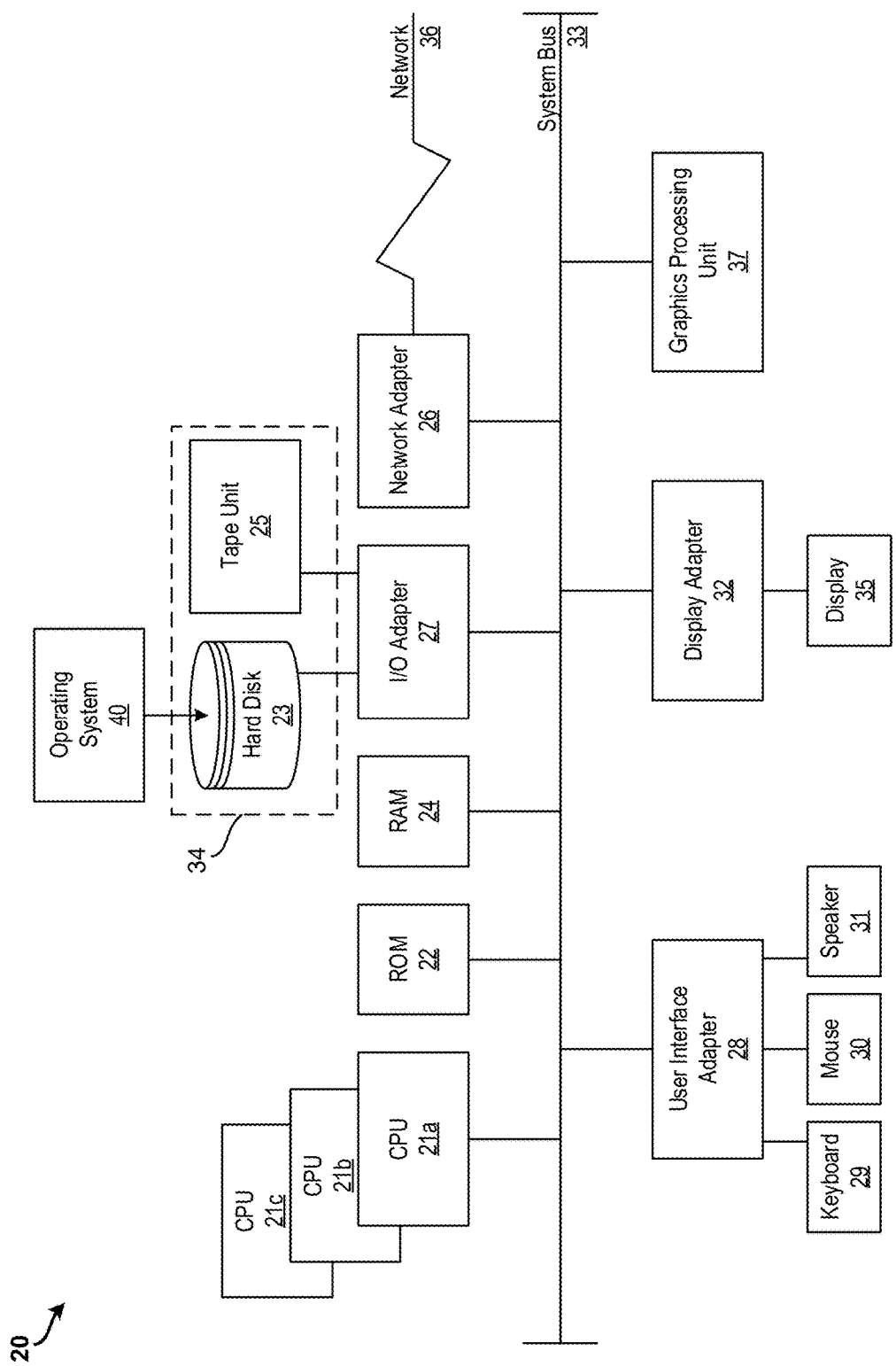
FIG. 4 illustrates a block diagram of a processing system for implementing the techniques described herein according to examples of the present disclosure.

It is understood in advance that the present disclosure is capable of being implemented in conjunction with any other type of computing environment now known or later developed. For example, FIG. 4 illustrates a block diagram of a processing system 20 for implementing the techniques described herein. In examples, processing system 20 has one or more central processing units (processors) 21*a*, 21*b*, 21*c*, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A computer-implemented method for memory transaction prioritization for a memory, the method comprising:
    allocating, by a memory controller, a reserved portion of the memory controller to execute transactions;
    receiving, by the memory controller, a priority based transaction from a processor to the memory;
    determining, by the memory controller, whether to accommodate the priority based transaction based at least in part on a current processing state of the memory controller; and
    based at least in part on determining to accommodate the priority based transaction, accommodating the priority based transaction by performing at least one of dropping a speculative command in a queue or using the reserved portion of the memory controller to execute the priority based transaction.

2. The computer-implemented method of claim 1, further comprising communicating, to the processor, the current processing state of the memory controller.

3. The computer-implemented method of claim 1, wherein the memory controller comprises logic to invalidate or drop transactions.

4. The computer-implemented method of claim 1, further comprising, subsequent to dropping a speculative command, propagating, by the memory controller, the dropped speculative command back to the processor.

5. The computer-implemented method of claim 4, further comprising returning, by the processor, the dropped speculative command back to the memory controller based on a confidence index if there is a need to have the dropped speculative command executed.

6. The computer-implemented method of claim 4, further comprising restarting, by the processor, a new transaction subsequent to dropping the speculative command.

7. The computer-implemented method of claim 1, wherein the speculative command comprises one of a prefetch command and a data cache block set to zero command.

8. A system for memory transaction prioritization for a memory, the system comprising:
    a memory comprising computer readable instructions; and
    a processor for executing the computer readable instructions for performing a method, the method comprising:
        allocating, by a memory controller, a reserved portion of the memory controller to execute transactions;
        receiving, by the memory controller, a priority based transaction from the processor to the memory;
        determining, by the memory controller, whether to accommodate the priority based transaction based at least in part on a current processing state of the memory controller; and
        based at least in part on determining to accommodate the priority based transaction, accommodating the priority based transaction by performing at least one of dropping a speculative command in a queue or using the reserved portion of the memory controller to execute the priority based transaction.

9. The system of claim 8, wherein the method further comprises communicating, to the processor, the current processing state of the memory controller.

10. The system of claim 8, wherein the memory controller comprises logic to invalidate or drop transactions.

11. The system of claim 8, wherein the method further comprises, subsequent to dropping a speculative command, propagating, by the memory controller, the dropped speculative command back to the processor.

12. The system of claim 11, wherein the method further comprises returning, by the processor, the dropped speculative command back to the memory controller based on a confidence index if there is a need to have the dropped speculative command executed.

13. The system of claim 11, wherein the method further comprises restarting, by the processor, a new transaction subsequent to dropping the speculative command.

14. The system of claim 8, wherein the speculative command comprises one of a prefetch command and a data cache block set to zero command.

15. A computer program product for memory transaction prioritization for a memory, the computer program product comprising:
- a computer readable storage medium having program instructions embodied therewith, wherein the computer readable storage medium is not a transitory signal per se, the program instructions executable by a processor to cause the processor to perform a method comprising:
  allocating, by a memory controller, a reserved portion of the memory controller to execute transactions;
  receiving, by the memory controller, a priority based transaction from the processor to the memory;
  determining, by the memory controller, whether to accommodate the priority based transaction based at least in part on a current processing state of the memory controller; and
  based at least in part on determining to accommodate the priority based transaction, accommodating the priority based transaction by performing at least one of dropping a speculative command in a queue or using the reserved portion of the memory controller to execute the priority based transaction.

16. The computer program product of claim 15, wherein the method further comprises communicating, to the processor, the current processing state of the memory controller.

17. The computer program product of claim 15, wherein the memory controller comprises logic to invalidate or drop transactions.

18. The computer program product of claim 15, wherein the method further comprises, subsequent to dropping a speculative command, propagating, by the memory controller, the dropped speculative command back to the processor.

19. The computer program product of claim 18, wherein the method further comprises returning, by the processor, the dropped speculative command back to the memory controller based on a confidence index if there is a need to have the dropped speculative command executed.

20. The computer program product of claim 18, wherein the method further comprises restarting, by the processor, a new transaction subsequent to dropping the speculative command.

* * * * *